United States Patent [19]
Desmarais

[11] Patent Number: 5,766,081
[45] Date of Patent: Jun. 16, 1998

[54] MODIFIED EAR DESIGN TO AVOID LOCK UP OF UNIVERSAL JOINT

[75] Inventor: Philip A. Desmarais, Gastonia, N.C.

[73] Assignee: Hand Tool Design Corporation, Wilmington, Del.

[21] Appl. No.: 763,184

[22] Filed: Dec. 10, 1996

[51] Int. Cl.⁶ .................................................. F16D 3/16
[52] U.S. Cl. ........................................ 464/119; 464/134
[58] Field of Search ........................... 464/119, 112, 464/114, 113, 134, 905; 81/177.75

[56] References Cited

U.S. PATENT DOCUMENTS

| | | |
|---|---|---|
| 1,354,912 | 10/1920 | Lockton et al. . |
| 1,498,713 | 6/1924 | York . |
| 1,806,723 | 5/1931 | Tetrault .................... 464/134 |
| 2,005,202 | 6/1935 | Pilger ....................... 464/119 |
| 2,196,297 | 4/1940 | Gagne . |
| 2,256,624 | 9/1941 | Odlum . |
| 2,304,766 | 12/1942 | Pratt ........................ 464/134 |
| 2,499,490 | 3/1950 | Good . |
| 2,575,602 | 11/1951 | Stillwagon, Jr. ........... 464/119 |
| 2,636,759 | 4/1953 | Rueb ....................... 464/119 X |
| 2,826,052 | 3/1958 | Stillwagon, Jr. ........... 464/119 |
| 3,044,282 | 7/1962 | Grundy . |
| 3,107,506 | 10/1963 | Klomp . |
| 3,224,222 | 12/1965 | Palmer, Sr. ............... 464/119 |
| 4,080,804 | 3/1978 | Falk . |
| 5,188,189 | 2/1993 | Hummel ..................... 173/213 |
| 5,342,243 | 8/1994 | Seksaria et al. ............ 464/134 |
| 5,433,548 | 7/1995 | Roberts et al. ............. 403/74 |
| 5,458,028 | 10/1995 | Cleveland, III ............ 81/177.75 |

FOREIGN PATENT DOCUMENTS 205417  2/1981  United Kingdom .................. 464/134

*Primary Examiner*—Eileen A. Dunn
*Attorney, Agent, or Firm*—Leonard Bloom

[57] ABSTRACT

A universal joint which has pivotal movement of each member less than 45°. The sides of the ears of each member are tapered to a predetermined angle, the radial distance between the center of the opening in each ear and the respective apex of each ear is a predetermined distance and the space between the first pin and the second pin in the connecting block is a predetermined distance.

10 Claims, 4 Drawing Sheets

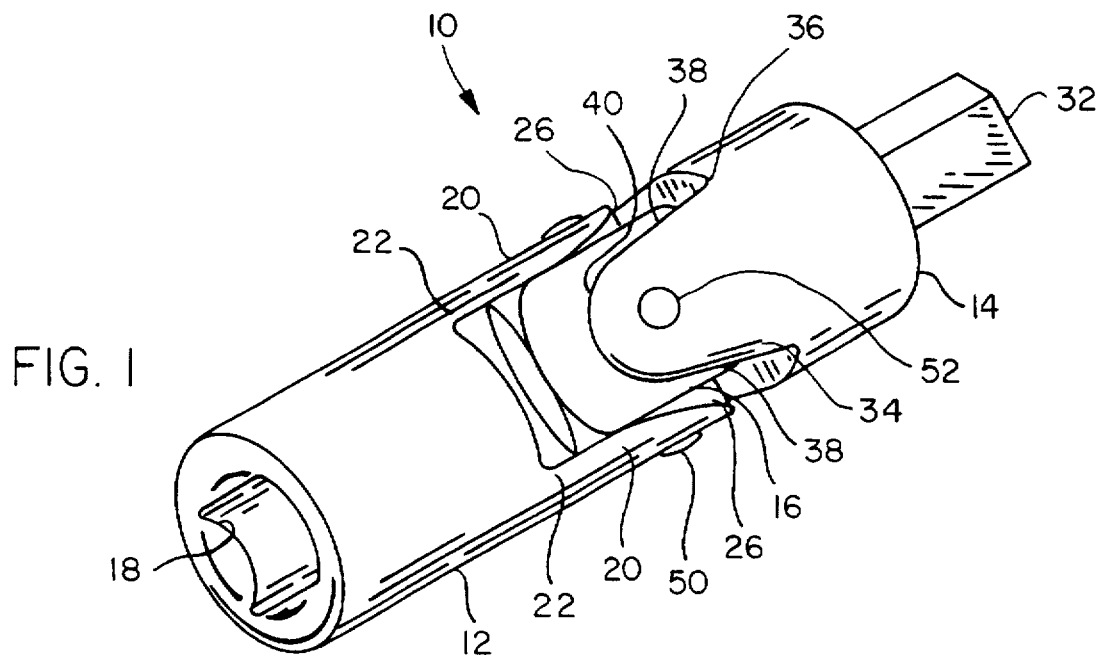
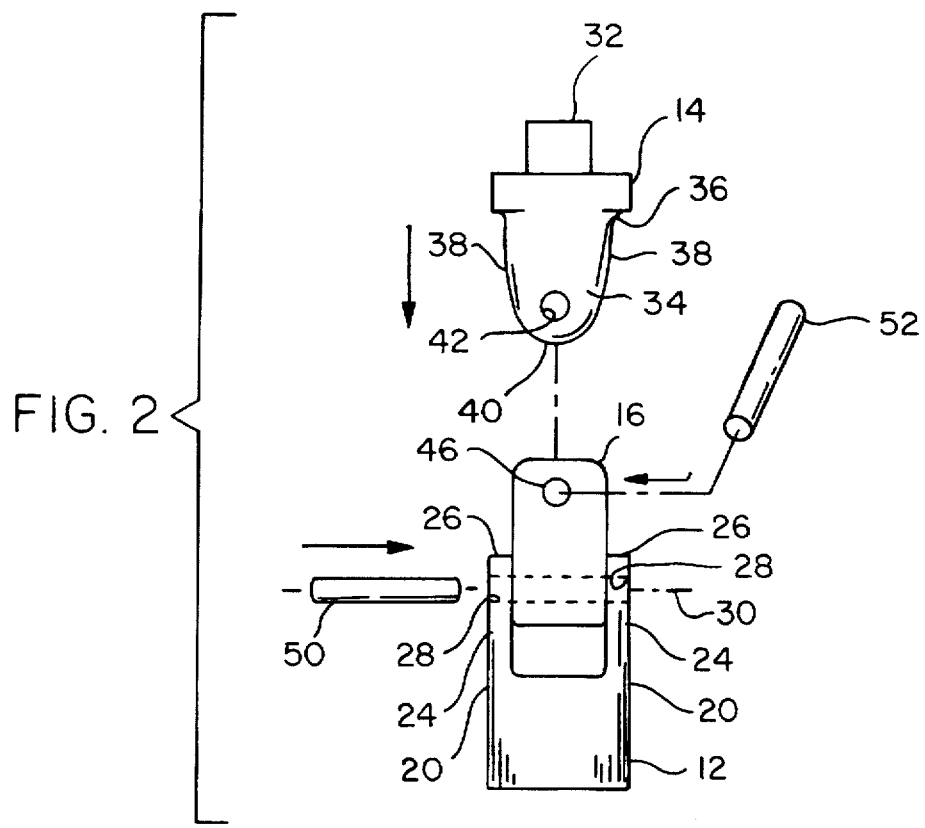

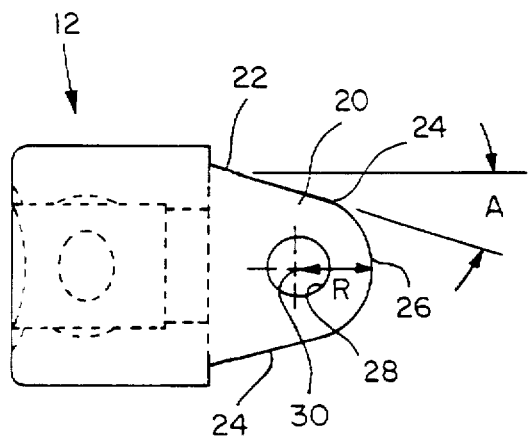
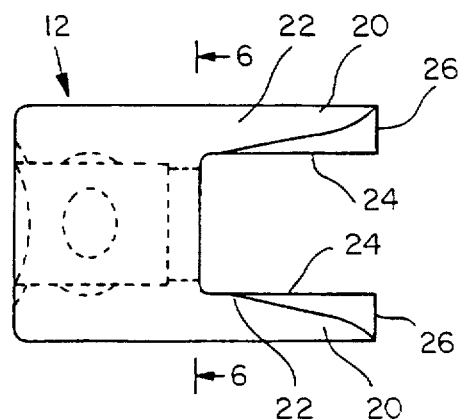
FIG. 3    FIG. 4
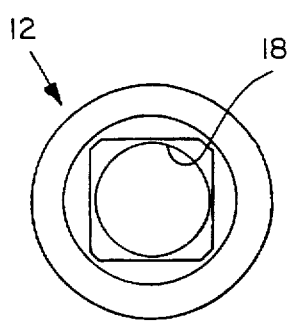
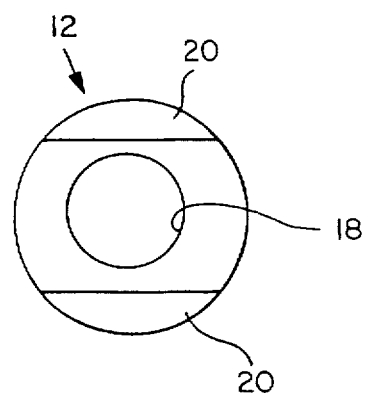
FIG. 5    FIG. 6

MODIFIED EAR DESIGN TO AVOID LOCK UP OF UNIVERSAL JOINT

BACKGROUND OF THE INVENTION

The present invention is directed to a universal joint to be used with wrenches and sockets and, more particularly to a universal joint which does not lock up and permits fluid transmission of force through the joint.

The universal joint to permit transmission of force angularly between a drive member such as engaged by a wrench and a driven member such as a tang is known. The applicant is aware of the following U.S. patents:

| U.S. Pat. No. | Inventor(s) |
| --- | --- |
| 1,498,713 | York |
| 2,005,202 | Pilger |
| 2,196,297 | Gagne |
| 2,256,624 | Odlum |
| 2,304,766 | Pratt |
| 5,433,548 | Roberts et al |
| 5,458,028 | Cleveland, III |

A problem which occurs with all of the universal joints with which the applicant is familiar is that as the torque is applied through an angle, the members of the universal joint are pivoted to such an extent that the members contact one another and are prevented from further movement. This is referred to as "lock-up" and prevents the fluid transmission of force between the driving member of the universal joint and the driven member.

The present invention is directed to overcoming this problem by controlling the configuration angles and radii of the members of the universal joint.

BRIEF SUMMARY OF THE INVENTION

It is an object of the present invention to provide a universal joint which does not lock up and permits fluid transmission of force through the joint.

In accordance with the teaching of the present invention, there is disclosed a universal joint having a driving first member having an opening formed axially therein and a pair of ears. The universal joint also has a driven second member having a driven tang connected thereto and a pair of ears. A connecting block is disposed between the ears of the respective members. A first pivot pin pivotally connects the ears of the first member to the connecting block. A second pivot pin pivotally connects the ears of the second member to the connecting block. The first pivot pin is spaced apart from and perpendicular to the first pivot pin. Each ear of each member has a base and two opposite sides extending from the base. The sides are joined at an apex. A respective opening is formed in each ear near the respective apex thereof. The sides of each respective ear are tapered at a predetermined angle from the base toward the apex. The respective opening in each ear has a center point. The apex of each ear is formed along a predetermined radial distance from the center point of the respective opening. Pivotal movement of the respective first member and second member with respect to a vertical center line through the connecting block is less than 45°. The universal joint moves fluidly without lock-up when force is transmitted through the drive portion to the driven portion.

In further accordance with the teachings of the present invention, the predetermined angle of each side of each ear is 15°±0.50° and the predetermined radius is dependent upon the size of the joint.

These and other objects of the present invention will become apparent from a reading of the following specification taken in conjunction with the enclosed drawings.

BRIEF DESCRIPTION OF THE DRAWINGS

FIG. 1 is a perspective view of the universal joint of the present invention.

FIG. 2 is an exploded view of the universal joint of the present invention.

FIG. 3 is a side elevation view of the driving first member of the present invention showing the tapered angle and radius of the apex.

FIG. 4 is a top elevation view of the driving first member of the present invention showing the spaced-apart ears.

FIG. 5 is a top elevation view showing the drive opening in the end of the drive member.

FIG. 6 is a cross-sectional view taken across the lines 6—6 of FIG. 4.

DESCRIPTION

Referring now to FIGS. 1 and 2, the universal joint 10 has a driving first member 12 and a driven second member 14 with a connecting block 16 therebetween.

Figure 7:
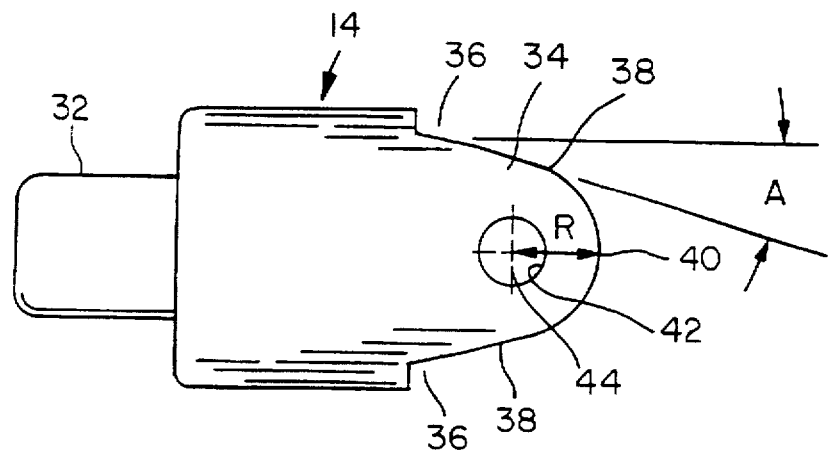
FIG. 7 is a side elevation view of the driven second member of the present invention showing the tang, the tapered angle and radius of the apex.
Figure 8:
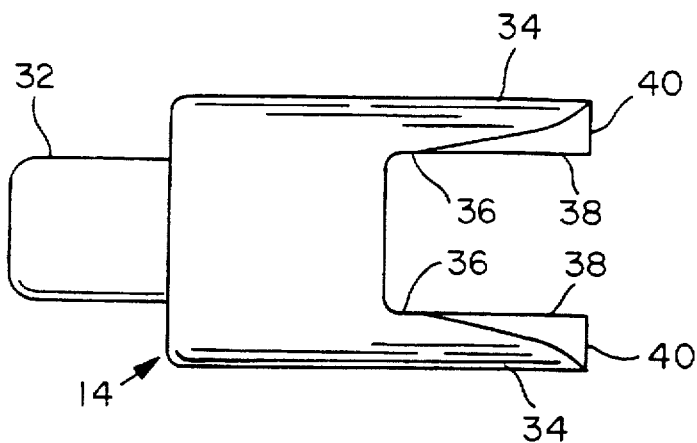
FIG. 8 is a top elevation view of the driven second member of the present invention showing the tang and the spaced-apart ears.

As shown in FIGS. 3–8, the first member 12 has a drive opening 18 formed axially therein. Preferably, the drive opening is square and has dimensions to receive therein the tang or drive means of a ratchet wrench or similar tool to transmit torque to the joint 10. A pair of ears 20 are formed on the first member 12, the ears 20 being diametrically opposed to one another and extending outwardly from the first member approximately parallel to one another. Each ear 20 has a base 22 adjacent to the drive opening 18, and two opposite sides 24 which extend from the base 22. The sides 24 on each ear are tapered at a predetermined angle from the base 22 and are joined at a respective apex 26. An opening 28 is formed in each ear 20 near the respective apex 26. Each opening 28 has a center point 30 and the respective apex is formed at a predetermined radial distance from the respective center point 30 of the opening 28.

The second member 14 has a drive tang 32 formed thereon. The drive tang 32 is received in a socket or other accessory to transmit torque to a workpiece (not shown). On the second member 14, opposite from the tang 32, there is formed a pair of ears 34. The ears 34 on the second member 14 are identical to the ears 20 on the first member 12 being diametrically opposed and extending outwardly from the second member in a direction opposite from the tang 32. The ears 34 each have a respective base 36 and two opposite sides 38 of each ear 38 which extend from the respective base 36. The sides 38 are tapered at a predetermined angle A which is the same angle as on the ears 20 on the first member 12. This angle A is 15°±0.50° for all of the universal joints 10 irrespective of the size of the joint as is described below. The sides 38 are joined at a respective arcuate apex 40 on each ear 34. An opening 42 is formed in each ear 34 near the respective apex 40. Each opening 42 has a center point 44 and the respective apex is formed at a predetermined radial distance from the respective center points 44 of the openings 42. The predetermined radial distance is the same distance as on the ears 20 on the first member 12.

Figure 9:
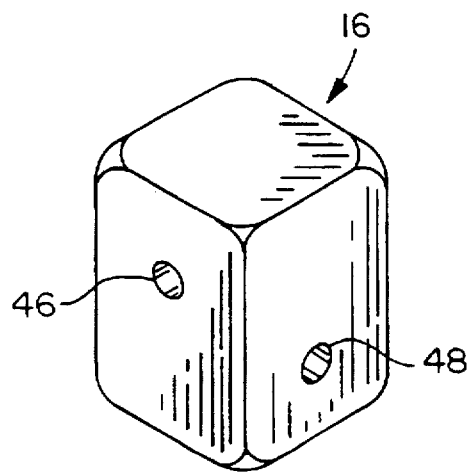
FIG. 9 is a perspective view of the connecting block showing openings on two faces for the pins.
Figure 10:
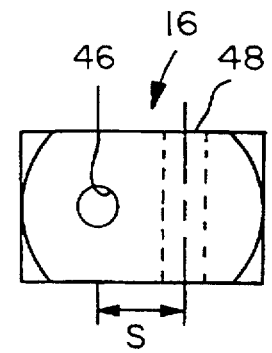
FIG. 10 is a side elevation view showing an opening for one pin and in broken lines, showing the opening for the other pin.
Figure 11:
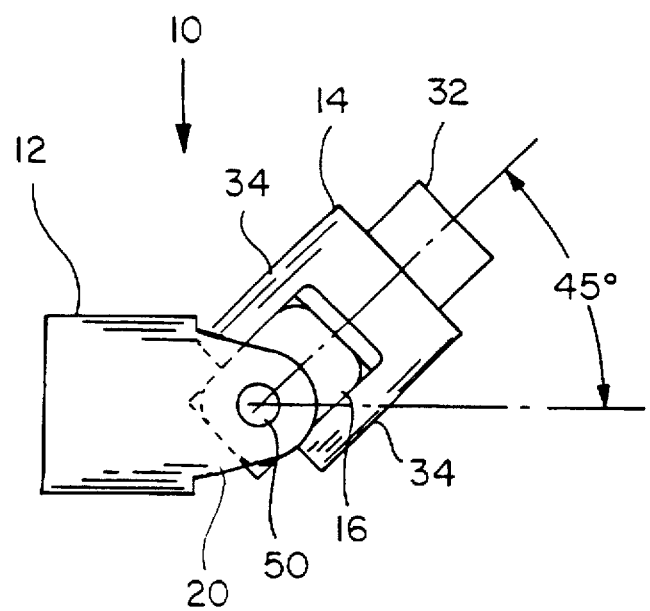
FIG. 11 is a side elevation view showing the maximum degree of rotation of which the present invention is capable.
Figure 12:
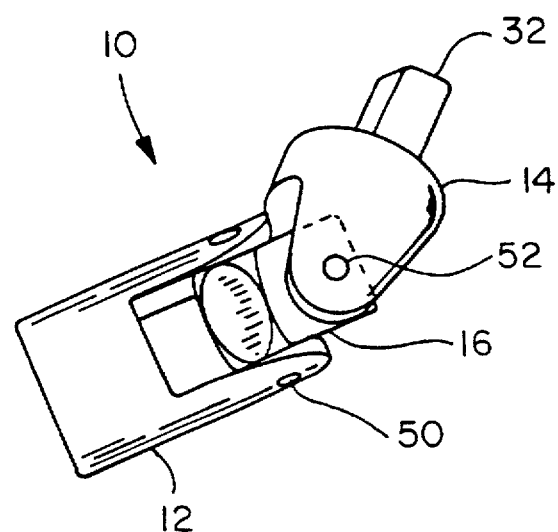
FIG. 12 is a perspective view showing the first and second member both pivoted at an angle with respect to the connecting block and to each other.

The connecting block 16 has a substantially square cross section and a length which is greater than the cross section (FIGS. 4–10). The connecting block 16 is disposed between the ears 20 on the first member 12 and the ears 34 on the second member 14 such that the space between the respective ears 20, 34 is slightly greater than the cross-sectional dimension of the connecting block 16. The connecting block 16 extends lengthwise between the first member 12 and the second member 14. The connecting block 16 has a first opening 46 and a second opening 48 formed therein. The openings are across the cross-sectional dimension of the connecting block 16 and are perpendicular to one another. The openings 46, 48 are spaced apart by a predetermined distance. The openings 28 in the ears 20 of the first member 12 are disposed opposite the first opening 46 in the connecting block 16 and the openings 42 in the ears 20 of the second member 16 are disposed opposite the second opening 48 in the connecting block 16. A first pin 50 is disposed through the openings 28 in the ears 28 on the first member 12 and through the first opening 46 in the block and is mounted in a manner to be retained therein. Similarly, a second pin 52 is disposed through the openings 42 in the ears 34 on the second member 14 and through the second opening 48 in the connecting block 16 and mounted to be retained therein. In this manner, the first member 12 is pivotally movable about one end of the connecting block 16 and the second member 14 is pivotally movable about the opposite end of the connecting block 16 about pivot points which are perpendicular to one another. When pivotally moved, the universal joint 10 transmits force angularly from the driving member 12 through the connecting block 16, to the driven member 14. This angular transmission of force enables the user to have access to a workpiece, even though the driving tool is unable, because spacial restrictions or other reasons, to be linearly connected to the workpiece. The ears of one, or both of the respective first and second members are disposed in the space between the ears of the other member.

Due to the predetermined configuration of the respective ears such as the tapered angle and the radial distance of the apex from the opening in the ear, and the spacing of the pins in the connecting block, the pivotal movement of the respective first member 12 and the second member 14 with respect to a vertical center line through the connecting block 16 is less than 45° for each member. This configuration prevents lock-up of the universal joint 10 and permits fluid movement of force applied to the driving member 12 and transmitted to the driven member 14 and to the workpiece.

The predetermined configuration of the universal joint 10 is dependent upon its size. The joint 10 which has a drive opening 18 in the first member 12 to receive a ½ inch tang is larger in overall dimensions than the joint which receives a ⅜ inch tang, which, in turn is larger in overall dimensions than the joint which receives a ¼ inch tang. The respective members 12, 14 and the connecting block 16 are sized accordingly.

For example, the radial distance R between the respective center points 30, 44 of the openings 28, 42 in the ears 20, 34 and the apex 26, 40 are in a range depending upon the size of the joint. The space S between the center line of the first pin 50 and the center line of the second pin 52 is also dependent on the size of the joint. Typical predetermined sizes are as follows:

| Drive opening in first member | Radial distance | Space between pins |
|---|---|---|
| ¼ inch | 0.158–0.155 inches | 0.165–0.157 inches |
| ⅜ inch | 0.236–0.233 inches | 0.223–0.215 inches |
| ½ inch | 0.296–0.293 inches | 0.254–0.246 inches |

A universal joint 10 having sides 24, 38 on the ears of the respective members which are tapered 15°±0.5° as described above, and having the predetermined dimensions as above, does not lock up and permits fluid transmissions of force across the universal joint.

Obviously, many modifications may be made without departing from the basic spirit of the present invention. Accordingly, it will be appreciated by those skilled in the art that within the scope of the appended claims, the invention may be practiced other than has been specifically described herein.

I claim:

1. In a universal joint having a first driving member having a drive opening formed axially therein and a first pair of ears, a driven second member having a drive tang connected thereto and a second pair of ears, a connecting block disposed between the ears of the respective members, a first pivot pin connecting the ears of the first member to the connecting block, a second pivot pin connecting the ears of the second member to the connecting block, the improvement comprising:

each ear of each member having a base and two opposite sides, the sides extending from the respective base and being joined at an arcuate apex, a respective opening being formed in each ear near the respective apex thereof, the sides of each respective ear being tapered at a predetermined angle from the base toward the apex, the respective opening in each ear having a center point, the arcuate apex of each ear being formed along a predetermined radial distance from the center point of the respective opening, the first pivot pin being spaced a predetermined distance apart from and perpendicular to the second pivot pin, wherein the pivotal movement of each of the first member and the second member with respect to a vertical center line through the connecting block is less than 45°, and the universal joint moves fluidly without lock up when force is transmitted through the drive member to the driven member.

2. The universal joint of claim 1, wherein the predetermined angle is 15°±0.5°.

3. The universal joint of claim 1, wherein the predetermined radial distance being related to the drive opening as follows:

| Drive opening in first member | Radial distance |
| --- | --- |
| ¼ inch | 0.158–0.155 inches |
| ⅜ inch | 0.236–0.233 inches |
| ½ inch | 0.296–0.293 inches |

4. The universal joint of claim 1, wherein the first pivot pin is spaced a predetermined distance from the second pivot pin.

5. The universal joint of claim 4, wherein the predetermined distance between the first pin and the second pin is related to the drive opening as follows:

| Drive opening in first member | Predetermining distance |
| --- | --- |
| ¼ inch | 0.165–0.157 inches |
| ⅜ inch | 0.223–0.215 inches |
| ½ inch | 0.254–0.246 inches |

6. In a universal joint having a first driving member having a first pair of ears, a second driven member having a second pair of ears, the first member and the second member each being pivotally connected to a connecting block disposed between the respective ears of the first member and the second member, the improvement comprising:

each respective ear on each member has a base and two opposite sides, the sides being joined at an arcuate apex, the sides of each respective first pair of ears and second pair of ears being tapered at an angle of 15°±0.5° from the base toward the arcuate apex, wherein pivotal movement of each of the first member and the second member with respect to a vertical center line through the connecting block is less than 45°, and the universal joint moves fluidly without lock up when force is transmitted through the drive member to the driven member.

7. In a universal joint having a first driving member having a first pair of ears, a second driven member having a second pair of ears, the first member and the second member each being pivotally connected to a connecting block disposed between the respective ears of the first member and the second member, the improvement comprising:

each ear having a respective arcuate apex formed thereon, each ear having a respective opening formed therein near the respective apex, each respective opening having a center point, the arcuate apex of each ear being formed along a predetermined radial distance from the center point of the respective opening, wherein pivotal movement of each of the first member and the second member with respect to a vertical center line through the connecting block is less than 45°, and the universal joint moves fluidly without lock up when force is transmitted through the drive member to the driven member.

8. The universal joint of claim 7, wherein the first drive member has a drive opening formed therein, the predetermined radial distance being related to the drive opening as follows:

| Drive opening in first member | Radial distance |
| --- | --- |
| ¼ inch | 0.158–0.155 inches |
| ⅜ inch | 0.236–0.233 inches |
| ½ inch | 0.296–0.293 inches |

9. In a universal joint having a first driving member having a drive opening formed axially therein and a first pair of ears, a driven second member having a second pair of ears, a connecting block disposed between the ears of the respective members, a first pivot pin connecting the ears of the first member to the connecting block, a second pivot pin connecting the ears of the second member to the connecting block, the first pivot pin being spaced apart from and perpendicular to the second pivot pin, the improvement comprising:

the first pivot pin being spaced a predetermined distance from the second pivot pin, wherein pivotal movement of each of the first member and the second member with respect to a vertical center line through the connecting block is less than 45°, and the universal joint moves fluidly without lock up when force is transmitted through the drive member to the driven member.

10. The universal joint of claim 9, wherein the predetermined distance between the first pin and the second pin is related to the drive opening as follows:

| Drive opening in first member | Predetermined distance |
| --- | --- |
| ¼ inch | 0.165–0.157 inches |
| ⅜ inch | 0.223–0.215 inches |
| ½ inch | 0.254–0.246 inches |

\* \* \* \* \*